United States Patent [19]
Okochi et al.

[11] Patent Number: 5,305,441
[45] Date of Patent: Apr. 19, 1994

[54] DATA COMMUNICATION SYSTEM PRIORITIZING DATA TRANSFER OVER MICROCOMPUTER DATA INTERRUPT PROCESSING

[75] Inventors: Toshio Okochi; Takeshi Miyazaki, both of Ohme, Japan

[73] Assignee: Hitachi, Ltd., Tokyo, Japan

[21] Appl. No.: 856,555

[22] Filed: Mar. 24, 1992

Related U.S. Application Data

[63] Continuation of Ser. No. 501,418, Mar. 28, 1990, Pat. No. 5,142,628, which is a continuation of Ser. No. 137,063, Dec. 23, 1987, abandoned.

[30] Foreign Application Priority Data

Dec. 26, 1986 [JP] Japan .................................. 61-308449

[51] Int. Cl.$^5$ ............................................. G06F 13/00
[52] U.S. Cl. ..................................... 395/325; 395/425; 364/239; 364/239.2; 364/242.3; 364/242.31; 364/242.1; 364/232.8
[58] Field of Search ................ 395/325, 250, 200, 425

[56] References Cited

U.S. PATENT DOCUMENTS

| | | | |
|---|---|---|---|
| 4,159,532 | 6/1979 | Getson et al. | 395/275 |
| 4,346,440 | 8/1982 | Kyu et al. | 364/200 |
| 4,358,825 | 11/1982 | Kyu et al. | 395/325 |
| 4,449,202 | 5/1984 | Knapp et al. | 364/900 |
| 4,471,427 | 9/1984 | Harris | 395/275 |
| 4,542,457 | 9/1985 | Mortensen et al. | 395/275 |
| 4,590,468 | 5/1986 | Steiglitz | 340/825.5 |
| 4,680,699 | 7/1987 | Uchino | 395/250 |
| 4,777,591 | 10/1988 | Chang et al. | 395/800 |
| 4,823,305 | 4/1989 | Holdren et al. | 395/325 |
| 4,942,515 | 7/1990 | Marzucco et al. | 395/275 |
| 5,142,628 | 8/1992 | Okochi et al. | 395/325 |
| 5,151,999 | 9/1992 | Marzucco et al. | 395/800 |

OTHER PUBLICATIONS

"Users Manual of NEC Electron Device uPD7201A", Nippon Electric Company, 1984, pp. 1-5 and 24-26.

Anzilotti, Michael, "Using the Intel 82592 to Integrate a Low-Cost Ethernet Solution Into a PC AT* Motherboard", Microcomputer Solutions, Intel Corp., Jan.-/Feb. 1989, pp. 20-24.

*Primary Examiner*—Paul V. Kulik
*Attorney, Agent, or Firm*—Fay, Sharpe, Beall, Fagan, Minnich & McKee

[57] ABSTRACT

A microcomputer system comprising a central processor unit, communication apparatus having a first memory to store receipt data, data transfer controller to transfer the receipt data stored in the first memory, a second memory, and counting apparatus, wherein the receipt data consists of at least one unit information item, and the counting apparatus is caused to count up in accordance with a number of the unit information items.

10 Claims, 2 Drawing Sheets

DATA COMMUNICATION SYSTEM PRIORITIZING DATA TRANSFER OVER MICROCOMPUTER DATA INTERRUPT PROCESSING

This application is a continuation application of U.S. Ser. No. 07/501,418, filed Mar. 28, 1990, now U.S. Pat. No. 5,142,628, which was a continuation application of U.S. Ser. No. 07/137,063, filed Dec. 23, 1987, now abandoned.

BACKGROUND OF THE INVENTION

This invention relates to communication control technology, and more particularly to a technique which is especially effective when applied to the serial communication between microprocessors. By way of example, the technique is effectively utilized for a serial communication device having a DMA (direct memory access) controller which transfers transmission data and reception data between a memory of first-in first-out scheme (hereinbelow, termed "FIFO") and a memory of random access scheme.

Heretofore, an LSI for communication such as μPD7201A manufactured by Nippon Electric Company has been provided in order to realize a serial communication between microprocessors. FIG. 4 shows an example of a system which uses this communication LSI μPD7201A. Along with a memory MEM, a DMA controller DMAC and the LSI for serial communication SIO are connected to a microprocessor CPU through a system bus BUS.

In this system, in a case where the microprocessor CPU has data to be transmitted to another microprocessor not shown, it sends a command to the DMA controller DMAC. Then, the DMA controller DMAC delivers addresses onto the system bus BUS and reads out the desired transmission data items in the memory MEM so as to supply them to the communication LSI SIO. The transmission data items supplied to the communication LSI SIO are once stored in a FIFO built therein and are thereafter converted into serial data items, which are output.

On the other hand, when reception data items enter the communication LSI SIO from outside, they are converted into parallel data items every byte, and the parallel data items are stored in a receiving FIFO. When the FIFO is filled up, the communication LSI SIO applies an interrupt to the microprocessor CPU to inform it of the situation. Then, the microprocessor CPU sends a read command to the DMA controller DMAC, and the DMA controller DMAC transfers the receipt data in the FIFO to the memory MEM. Thereafter, the microprocessor CPU accesses the memory MEM, whereby the receipt data can be obtained (refer to "Users Manual of NEC Electron Device μPD7201A", pp. 1–5 and 24–26, issued by Nippon Electric Company in 1984).

The communication LSI μPD7201A is an LSI which performs a control conforming to an HDLC (high-level data link control) protocol that transmits data in a unit called "frame". With the protocol which carries out the data communication in frame unit, it is sometimes desired that the microprocessor executes the analysis of receipt data, etc. every received frame. In this regard, the above system employing the communication LSI μPD7201A is so constructed that, each time final data indicating the end of one frame enters, an interrupt signal is sent to the microprocessor.

However, with the system wherein the microprocessor is interrupted every frame as stated above, when the interrupt shifts a bus mastership to the microprocessor which accordingly executes the process, the transfer of data to the memory MEM by the DMA controller is suspended meantime. As a result, the transfer of the next frame received in the FIFO to the memory MEM becomes impossible, and this forms a cause for lowering the efficiency of communication in the case where a plurality of frames are successively transmitted to arrive.

SUMMARY OF THE INVENTION

In view of the aforementioned drawback, the inventors studied a system according to which, in the case where the frames are sent in somewhat successively as described above, priority is given to the transfer of the frames received in the FIFO to the memory. That is, at the first stage, all the frames which are successively sent in are received and transferred to the memory MEM. At the next stage, an interrupt is applied from, e.g., the DMA controller to the microprocessor, whereby the microprocessor becomes a bus master in place of the DMA controller and executes the processes for the frames transferred to the memory MEM.

Since the prior-art system does not include the function of counting the number of received frames, the number of frames to be processed by the microprocessor after the end of the transfer of the frames to the memory MEM is not known. In this regard, the inventors' study has revealed that normal analyses might fail to progress because the length of an interrupt request signal or the number of interrupt request signals which, e.g., the DMA controller ought to send to the microprocessor is unknown. Certainly the number of frames can be known in such a way that the microprocessor reads out all the received data items in the memory MEM after the end of the transfer. With such a method, however, a considerably long time is expended merely on the procedure for knowing the number of frames.

An object of this invention consists, in a microcomputer system having a serial communication device which transmits data in frame unit, in reducing an overhead in the reception of data thereby to raise the efficiency of communication and also lightening the burden of a microprocessor thereby to improve the throughput of the system.

The aforementioned and other objects and novel features of this invention will become apparent from the description of the specification as well as the accompanying drawings.

A typical aspect of performance of this invention is summarized as follows: In a case where frames are being received somewhat successively, data transfer to a memory is preferred, and a microprocessor is inhibited from becoming a bus master. In addition, a counter for counting the number of received frames is provided within a system. A count value counted by the counter is counted down each time the microprocessor ends a process for one frame. As a method of acknowledging that the frames are being received somewhat successively, there is considered, for example, one which decides the successive reception whenever any received frame exists in a FIFO. This method is based on the view that the existence of any received frame in the FIFO in spite of the continuation of the operation of transferring a received frame from the FIFO to the memory will demonstrate the somewhat successive reception of frames.

According to the above expedient, while the reception of a series of frames continues, the frame is transferred to the memory by a DMA controller, and the process of the frame or frames in the memory by the microprocessor is started after the reception of the final frame. Thus, the interrupt process of the microprocessor as incurs the suspension of the DMA transfer can be prevented to raise the communication efficiency. In addition, when the microprocessor is to analyze communication data after the reception of the series of frames, the number of the received frames is immediately known from the value of the counter, whereby the object of lightening the burden of the microprocessor to improve the throughout of the system can be accomplished.

As a method of acknowledging that the final frame among the series of successive frames has been received, there is considered, for example, one which decides the reception of the final frame when no receipt data has come to exist in the FIFO. It demonstrates the end of the reception of the series of frames that, as the result of the successive transfer of the frame data in the FIFO to the memory, no data has come to exist in the FIFO storing the received frames therein.

DESCRIPTION OF THE PREFERRED EMBODIMENTS

Figure 1:
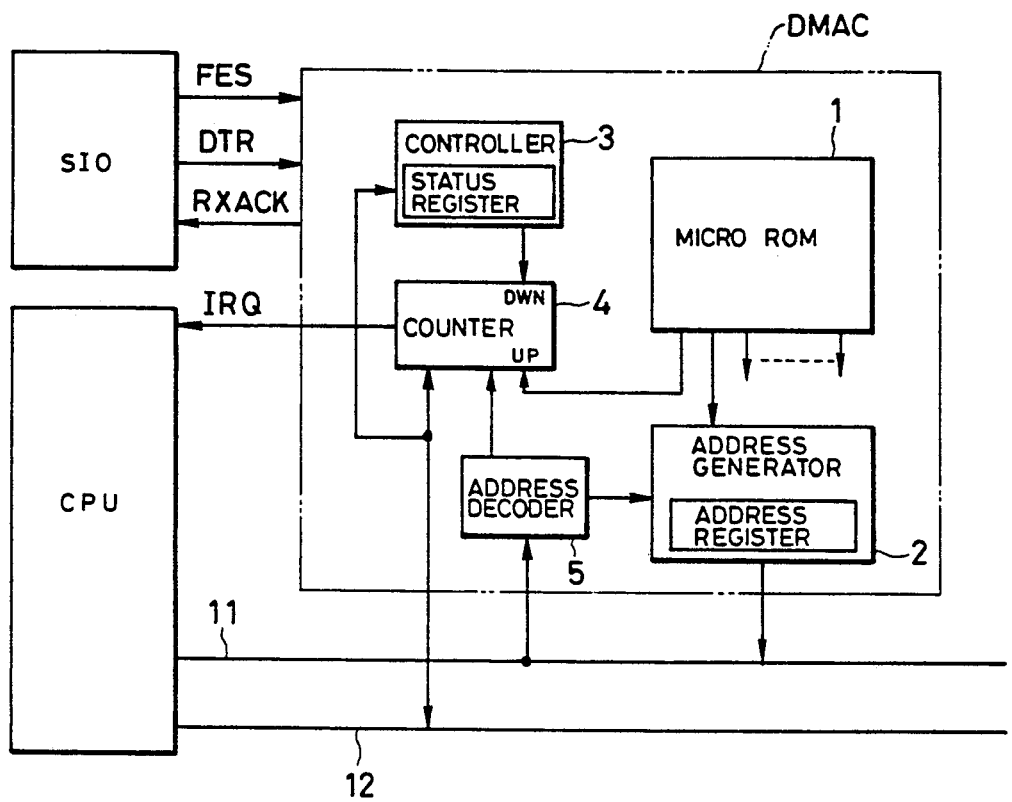
FIG. 1 is a block diagram showing an embodiment of a DMA controller which constitutes a serial communication device according to the present invention.

Shown in FIG. 1 is an embodiment of a DMA controller which constructs a microcomputer system having a serial communication function, conjointly with an LSI (SIO) for a communication control conforming to an HLDC protocol.

The DMA controller of this embodiment includes a micro ROM (read only memory) 1, an address generator 2 for generating the address of a memory to which data is to be transferred, and a controller 3 having a control register, a status register, etc. and operating, e.g., for determining operation modes in the DMA controller. The micro ROM 1 stores therein a microprogram which consists of a series of microinstructions for executing, e.g., the DMA transfer of receipt data from a receiving data FIFO built in the communication controller SIO to the memory on a host computer side. Control signals for various portions within the DMA controller are generated on the basis of the microinstructions read out.

When a DMA transfer request signal DTR enters the DMA controller DMAC from the communication controller SIO, the micro ROM 1 is started to read out the series of corresponding microinstructions, according to which the address generator 2 is controlled so as to successively generate destination addresses indicative of data transfer goals and deliver them onto the address bus 11 of the system (on this occasion, the head address of a data storing region prepared in the memory is previously set in a register built in the address generator 2 by a microprocessor CPU). Simultaneously with the output of the addresses, the DMA controller DMAC sends an acknowledge signal RXACK to the communication controller SIO. Then, receipt data items in an amount of one frame are automatically read out from the FIFO in the communication controller SIO and delivered onto a data bus 12. The receipt data read out from the FIFO may well be once loaded in the DMA controller and thereafter transferred to the memory. In this embodiment, however, the destination addresses are output from the DMA controller onto the address bus 11 in correspondence with the output of the receipt data in the FIFO onto the data bus 12. In consequence, the data items on the data bus 12 are directly stored in the memory on the host computer side.

Moreover, this embodiment is provided with a counter circuit 4 which counts the number of receipt frames. When a frame end signal FES is supplied from the communication controller SIO to the DMA controller, the micro ROM 1 produces a frame end management signal, in response to which the counter circuit 4 performs a countup operation. By way of example, this counter circuit 4 takes the logical sum of the bits thereof and delivers it as an interrupt request signal IRQ for the microprocessor CPU. Besides, the counter 4 can be externally read out by the microprocessor CPU at any time. To this end, an address decoder 5 is disposed in the DMA controller. Incidentally, the DMA transfer request signal DTR is rendered, for example, a high level in a case where the receipt data is held stored in the FIFO within the communication controller SIO. Thus, the transfer request for the DMA controller DMAC is generated. On the other hand, in a case where the receipt data is not held stored in the FIFO, the DMA transfer request signal DTR is rendered a low level. Thus, the transfer request for the DMA controller DMAC is extinguished.

In the microcomputer system with the serial communication function which employs the DMA controller of this embodiment, the interrupt request signal IRQ provided from the DMA controller DMAC is treated as a signal which is lower in the priority level than the DMA transfer request signal DTR provided toward the DMA controller DMAC. Thus, even when the frame end signal FES supplied from the communication controller SIO to the DMA controller causes the counter 4 to count up and to produce the interrupt request signal IRQ, the DMA transfer request signal DTR is preferred in the presence of the next receipt frame, and a process such as the analysis of the receipt data by the microprocessor CPU is not started. That is, in the system of this embodiment, the interrupt process by the microprocessor CPU is comprehensively executed after the final frame has arrived from a communication line to end the pertinent transfer and to release the state in which the DMA controller occupies the buses. Unlike the prior-art system, therefore, the reception of the frames is not suspended midway, and the communication efficiency is enhanced.

Though not especially restricted, the DMA controller DMAC of this embodiment is so constructed as to perform the DMA transfer control with it stipulated as one condition that an enable bit provided in the status register of the controller 3 is set to "1" by the microprocessor CPU. For example, the enable bit is set to "1" in such a way that the head address of the region where the data to be transferred by the DMA controller DMAC is stored is set in the register within the address generator 2.

Figure 2:
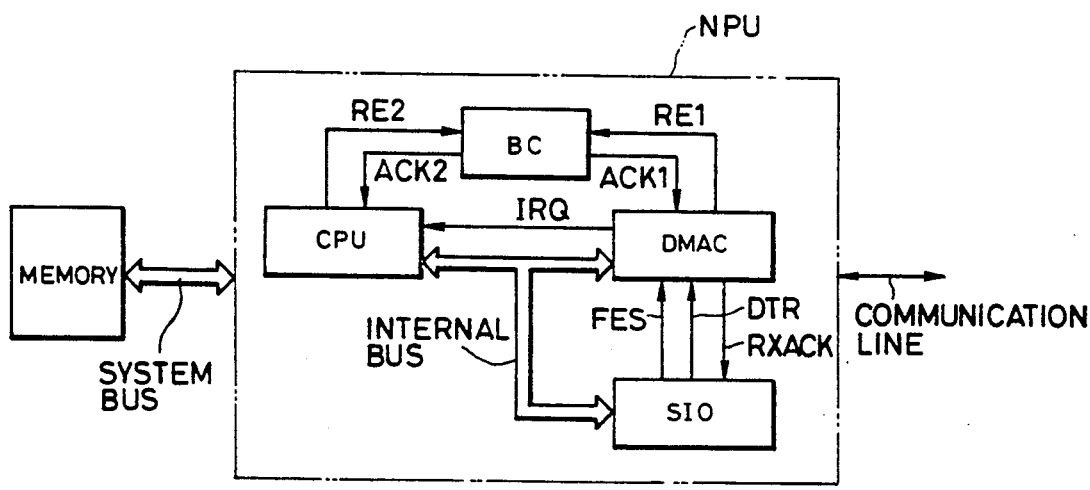
FIG. 2 is a block diagram showing an example of a serial communication system to which the present invention is applied.

FIG. 2 shows another embodiment of this invention. In this embodiment, a microprocessor CPU, a DMA controller DMAC, a communication controller SIO and a bus controller BC are formed on an identical semiconductor substrate. The single-chip semiconductor constructs a communication or network controlling processor NPU. Control signals provided between the DMA controller DMAC and the communication controller SIO or the microprocessor CPU, namely, a frame end signal FES, a DMA transfer request signal DTR, an acknowledge signal RXACK and an interrupt request signal IRQ serve similarly to the control signals of the same symbols shown in FIG. 1, respectively. In this embodiment, the bus controller BC for an internal bus is disposed within the communication controlling processor NPU. This bus controller BC receives a bus occupancy request signal RE1 from the DMA controller DMAC, and returns an acknowledge signal ACK1 to the DMA controller DMAC when it acknowledges the request. In addition, it receives a bus occupancy request signal RE2 from the microprocessor CPU and returns an acknowledge signal ACK2 to the microprocessor MPU when it acknowledges the request. In a case where the bus occupancy request signals RE1 and RE2 are simultaneously generated, the acquisition of a bus mastership by the DMA controller DMAC is preferred. In this embodiment, the bus occupancy request signal RE1 is generated in response to the generation of the DMA transfer request signal DTR, while the bus occupancy request signal RE2 is generated in response to the generation of the interrupt request signal IRQ.

Figure 3:
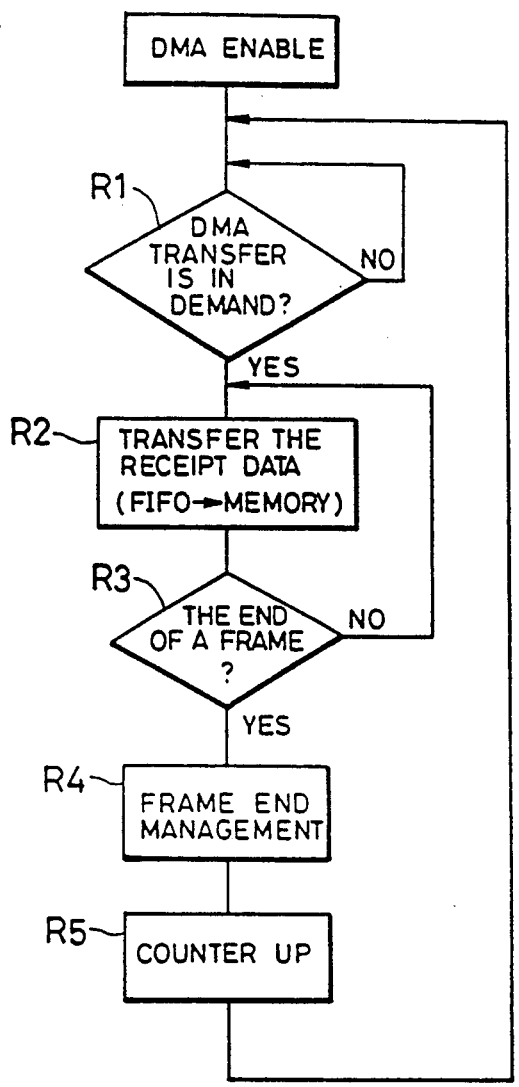
FIG. 3 is a flow chart showing an example of frame transfer routines by the DMA controller according to the present invention.
Figure 4:
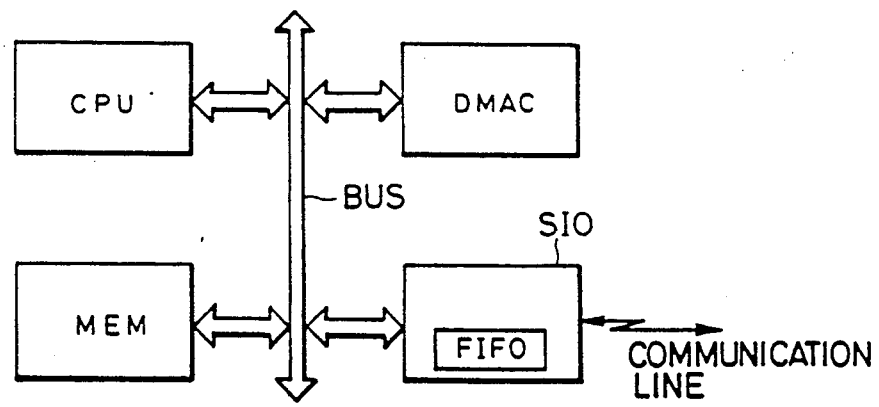
FIG. 4 is a block diagram showing an example of arrangement of a microcomputer system which has a serial communication device composed of a communication controller and a DMA controller.

FIG. 3 exemplifies the routines of the frame receiving process based on the microprogram within the DMA controller DMAC in each of the foregoing embodiments.

When the enable bit provided in the status register within the controller 3 is "1", the DMA controller first decides whether or not the DMA transfer request signal DTR has been received from the communication controller SIO (routine R1). In the presence of the DMA transfer request, the DMA controller reads out one byte of the receipt data stored in the FIFO in byte unit and transfers it to the memory (routine R2). Subsequently, the DMA controller checks the frame end signal FES to decide whether or not a frame has ended (routine R3). Here, when it is decided that the frame has not ended, the process returns to the routine R2 to repeat the transfer of data again. When the frame has ended in due course, a frame end management routine R4 is executed, and the counter 4 is caused to count up (routine R5). Then, the process returns to the routine R1 again, and the above operations are repeated. Here, the "frame end management routine" is intended to mean, for example, the operations of checking whether or not an error is contained in the receipt data, discriminating the sort etc. of the error, and storing the results in a status register (not shown) within the communication controller SIO.

The counter circuit 4 in the foregoing embodiment is so constructed as to count down, for example, in such a way that the microprocessor CPU writes "1" into a frame end bit provided in the status register within the controller 3.

When the reception of the series of frames has ended, the bus mastership shifts to the microprocessor CPU, by which the analysis of the receipt data, etc. are performed. The end of the reception of the series of frames can be judged from the fact that the receipt data items stored in the FIFO within the communication controller SIO have been entirely transferred to the memory to empty the FIFO. Subsequently, when the frame process of one frame by the microprocessor CPU has ended, "1" is written into the frame end bit, and the counter 4 in the DMA controller DMAC is caused to count down. Meantime, the interrupt request signal IRQ for the microprocessor continues to be supplied until the value of the counter becomes "0". Therefore, the microprocessor recognizes that the process has not ended up to the final frame yet, and it shifts to the process of the next frame.

In this manner, according to the embodiment, even when the DMA controller has successively performed the transfer processes of the plurality of receipt frames, the microprocessor can repeat the frame processes such as the analyses of the receipt data in the number of the frames after the completion of the transfer. Accordingly, the microprocessor can accurately know the number of the frame end interrupts or the period of time necessary for the interrupt process without decoding a status after each transfer process in search of the tail of the frame, even when the receipt frames have been transferred in succession. Therefore, such a procedure for confirming the number of the frames need not be taken, and the throughput of the system is improved.

Although, in the above embodiment, only the receiving functions of the communication controller SIO and the DMA controller DMAC have been described, usually transmitters are also provided within the LSI's of these controllers, and the present embodiment is not exceptional.

As described above, according to the embodiment, in a microcomputer system having a serial communication device which transmits data in frame unit, a counter which counts frame end signals is disposed in a DMA controller DMAC which transfers data to a memory from a FIFO storing the data of received frames therein. While the count value of this counter is "1" or above, a microprocessor CPU is continuously supplied with an interrupt request signal IRQ which is lower in the priority level than a DMA transfer request signal DTR. Therefore, while the reception of a series of frames continues, the frames are accepted and are transferred to the memory by the DMA controller. In addition, the interrupt processes of frames by the microprocessor are started after the reception of the series of frames. In this case, the count value having been counted by the counter is counted down each time the microprocessor ends its process for one frame. Thus, the suspension of DMA transfer attendant upon the interrupt process of the microprocessor is prevented, and this operation brings forth the effect that the communication efficiency is raised. Moreover, when the microprocessor is to analyze the communication data after the end of the reception of the series of frames, it can immediately know the number of the receipt frames from the value of the counter, and this operation brings forth the effect that the burden of the microprocessor is lightened to enhance the throughput of the system.

Although, in the above, the invention made by the inventors has been concretely described in conjunction with embodiments, it is needless to say that the present invention is not restricted to the foregoing embodiments, but that it can be variously modified within a scope not departing from the purport thereof. For example, the counter for counting the number of receipt frames is disposed in the DMA controller DMAC, but it may be disposed in any other place without being restricted thereto.

Besides, the embodiments have been described by way of example as to the case of application to the serial communication device conforming to the HDLC protocol. However, the communication protocol is not restricted to the HDLC, but the invention is similarly applicable to a serial communication device conforming to a protocol of any other type in which a series of communication data items are divided into a plurality of groups that are then transmitted.

Although the invention made by the inventors has thus far been principally described as to the application to the DMA controller for the serial communication forming the background field of utilization, this invention is not restricted thereto but can be utilized for general DMA controllers.

What is claimed is:

1. A communication controller for use with:
   a bus;
   a bus controller;
   a memory coupled to the bus for storing first data therein; and,
   a microprocessor coupled to the memory and responsive to an interrupt request signal for providing a first bus request signal to the bus controller to process the first data stored in the memory,
   the communication controller comprising:
      serial communication means for receiving serial data in frame units, and including buffer memory means for storing parallel data corresponding to the received serial data therein, wherein the serial communication unit includes means for providing a data transfer request signal in response to reception of the serial data and means for providing a frame end signal in response to reception of each frame unit of the serial data;
      data transfer means responsive to the data transfer request signal for providing a second bus request signal to the bus controller to transmit the parallel data stored in the buffer memory means to the memory via the bus, wherein said bus controller recognizes a priority of the second bus request signal being higher than that of the first bus request signal, the bus controller granting a bus mastership to the data transfer means over the microprocessor when the first and second bus request signals are simultaneously generated; and,
      indication means, operatively associated with said data transfer means and said serial communication means, for indicating a count value using a plurality of bits corresponding to a number of frame units of the stored data to be processed by the microprocessor and for generating the interrupt request signal in response to a non-zero count value.

2. The communication controller according to claim 1, wherein the indication means includes a counter circuit comprising:
   means for performing a count-up operation upon receipt of each frame end signal from the serial communication means; and,
   means for performing a count-down operation in response to each predetermined operation executed by the microprocessor on the data stored in the memory.

3. A communication controller in an apparatus including a bus, a bus controller recognizing a priority of a second bus request signal being higher than that of a first bus request signal, a memory coupled to the bus for storing first data therein and, a microprocessor coupled to the memory and responsive to an interrupt request signal for providing said first bus request signal to the bus controller to process the first data stored in the memory, the communication controller comprising:
   serial communication means for receiving serial data in frame units, and including buffer memory means for storing parallel data corresponding to the received serial data therein, wherein the serial communication unit includes means for providing a data transfer request signal in response to reception of the serial data and means for providing a frame end signal in response to reception of each frame unit of the serial data;
   data transfer means responsive to the data transfer request signal for providing said second bus request signal to the bus controller to transmit the parallel data stored in the buffer memory means to the memory via the bus, the bus controller granting a bus mastership to the data transfer means over the microprocessor when the first and second bus request signals are simultaneously generated; and,
   counter means, operatively associated with said data transfer means and said serial communication means, for indicating a count value using a plurality of bits corresponding to a number of frame units of the stored data to be processed by the microprocessor and for generating the interrupt request signal in response to a non-zero count value.

4. The communication controller according to claim 3, wherein the counter means includes a counter circuit comprising:
   means for performing an increment operation upon receipt of each frame end signal from the serial communication means; and,
   means for performing a decrement operation in response to each predetermined operation executed by the microprocessor on the data stored in the memory.

5. A communication controller for receiving serial data in frame units for use with a data processing system including:
   a bus;
   a bus controller;
   a memory means coupled to the bus for storing first data corresponding to the serial data received into the communication controller; and,
   a microprocessor coupled to the bus and responsive to an interrupt request signal and for providing a first bus request signal to the bus controller to process the data stored in the memory means and to execute a predetermined operation when each frame unit of the first data in the memory means is processed,
   the communication controller comprising:
      serial communication means for receiving the serial data and including buffer memory means for storing parallel data corresponding to the received serial data therein, the serial communication means further including means for providing a data transfer request signal in response to reception of the serial data and means for providing a frame end signal in response to reception of each frame unit of the serial data;

data transfer means responsive to the data transfer request signal for providing a second bus request signal to the bus controller to transmit the parallel data stored in the buffer memory means to the memory means via the bus, wherein a priority of the second bus request signal is recognized by said bus controller as being higher than that of the first bus request signal such that the bus controller gives a bus mastership to the data transfer means when the first and second bus request signals are simultaneously generated; and, counter means operatively associated with said data transfer means and said serial communication means for generating a count value comprising a plurality of bits indicating a number of frame units of the stored data to be processed by the microprocessor and for generating said interrupt request signal in response to a non-zero count value, wherein the counter means includes means for performing a count-up operation upon receipt of each frame end signal from the serial communication means, and means for performing a count-down operation in response to each predetermined operation executed by the microprocessor.

6. A communication controller apparatus for use with a data processing system including a bus, a bus controller for granting a bus mastership of said bus and a microprocessor for processing stored data held in a main memory responsive to an interrupt request signal and executing a predetermined operation each time a predetermined quantity of information is processed, the communication controller apparatus comprising:

communication means for receiving first information comprised of frames of data as said predetermined quantity into the data processing system from an external apparatus operatively associated with the data processing system, the communication means including:

buffer memory means for temporarily storing the received first information therein, the buffer memory means being capable of storing at least one frame of data;

means for generating a data transfer request signal in response to storage of the received first information; and, means for generating a frame end signal in response to reception of each frame of information into the buffer memory means;

data transfer means connected to the communication means, the microprocessor and the main memory and responsive to the data transfer request signal for removing the received first information from the buffer memory means and transferring the removed first information to the main memory as said stored data and for generating said interrupt request signal when said communication means begins receiving said first information, wherein said bus controller recognizes a priority of the data transfer request signal being higher than that of the interrupt request signal, the bus controller granting bus mastership to the data transfer means over the microprocessor when the data transfer request signal and the interrupt request signal are simultaneously generated; and, counter means operatively associated with the communication means and the microprocessor for generating a count value indicating a number of frames of the stored data to be processed according to said predetermined operation by the microprocessor, the counter means performing a count-up operation in response to reception of each frame end signal and performing a count-down operation in response to each predetermined operation executed by the microprocessor, the count value being selectively read by the microprocessor to determine the number of frames of information to be processed according to the predetermined operation.

7. The communication controller apparatus according to claim 6 wherein:

said buffer memory means comprises a first-in first-out buffer;

said communication means further comprises means for transforming the received first information comprised of frames of data into parallel data and means for storing the parallel data in said buffer memory means according to a first-in first-out scheme; and, said data transfer means is a direct memory access controller.

8. The communication controller apparatus according to claim 7, wherein said data transfer means includes the counter means.

9. The communication controller apparatus according to claim 6, wherein said counter means further includes an interrupt request signal means responsive to the presence of a non-zero count value for interrupting the microprocessor.

10. A communication controller for receiving a plurality of frames of serial data in a data processing system including a bus; a bus controller recognizing a priority of a second bus request signal as being higher than that of a first bus request signal; a memory means coupled to the bus for storing first data; and, a microprocessor coupled to the bus and responsive to an interrupt request signal to generate said first bus request signal requesting control over said bus from the bus controller in order to process the first data stored in the memory means and to execute a predetermined operation when each frame of the data in the memory means is processed, the communication controller comprising:

serial communication means for receiving the serial data into the data processing system, the serial communication means including buffer memory means for storing parallel data corresponding to the received serial data, means for generating a data transfer request signal in response to reception of the serial data, and means for generating a frame end signal in response to reception of each of said plurality of frames of serial data;

data transfer means responsive to the data transfer request signal for generating said second bus request signal requesting control over said bus from the bus controller in order to transmit the parallel data stored in the buffer memory means to the memory means via said bus, the bus controller giving said bus mastership to the data transfer means when the first and second bus request signals are simultaneously generated; and, counter means operatively associated with said data transfer means and said serial communication means for generating a count value comprising a plurality of bits indicating a number of frames of the stored data to be processed by the microprocessor and for generating said interrupt request signal in response to a non-zero count value, wherein the counter means includes means for performing a count-up operation upon receipt of each frame end signal from the serial communication means, and means for performing a count-down operation in response to each predetermined operation executed by the microprocessor.

* * * * *